Sept. 9, 1958 H. H. INGERSOLL 2,850,969
SCREEN TYPE PRINTING MACHINE
Filed Feb. 17, 1955 9 Sheets-Sheet 1

INVENTOR.
HOMER H. INGERSOLL
BY
ATTORNEY

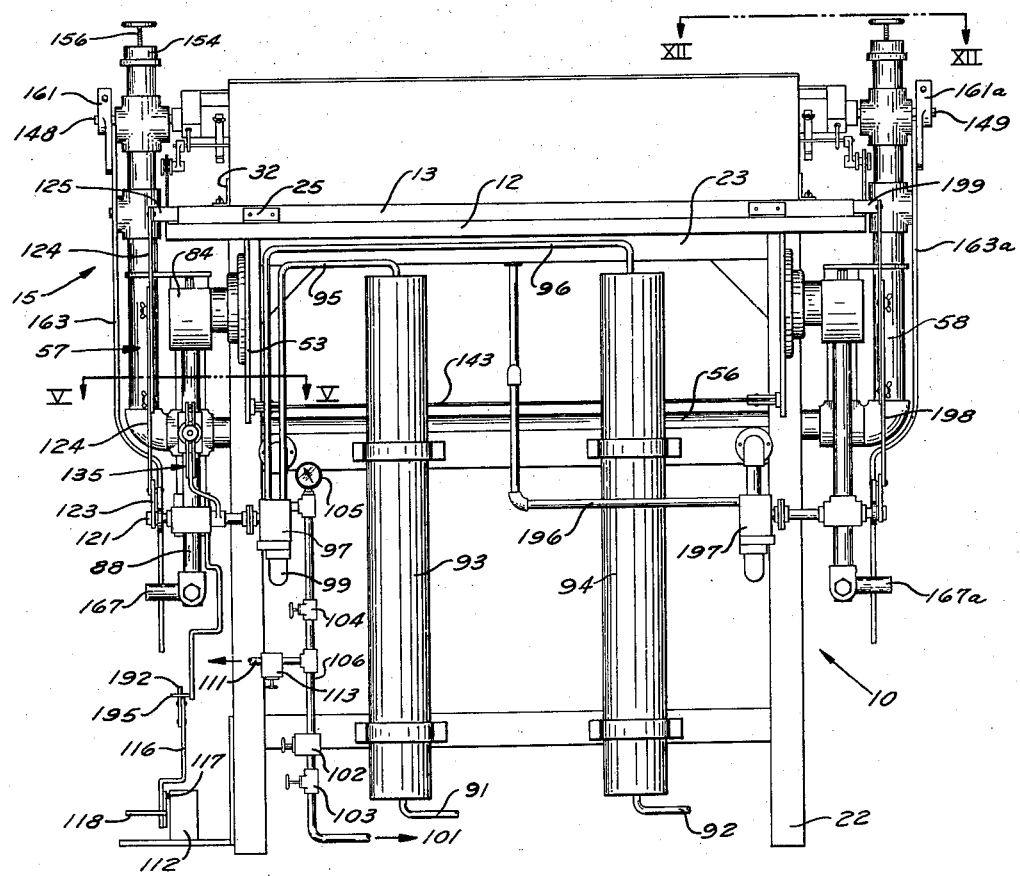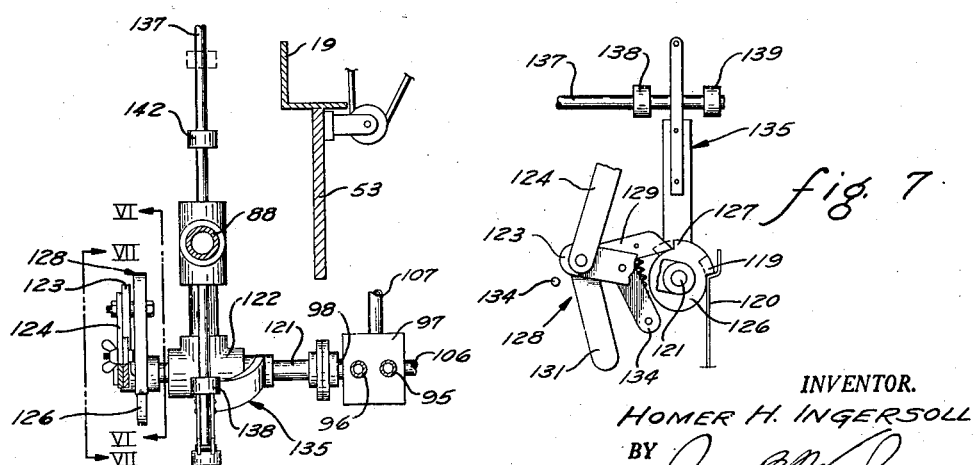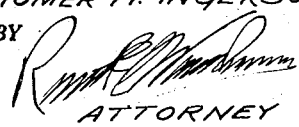

Sept. 9, 1958      H. H. INGERSOLL      2,850,969
SCREEN TYPE PRINTING MACHINE
Filed Feb. 17, 1955      9 Sheets-Sheet 3
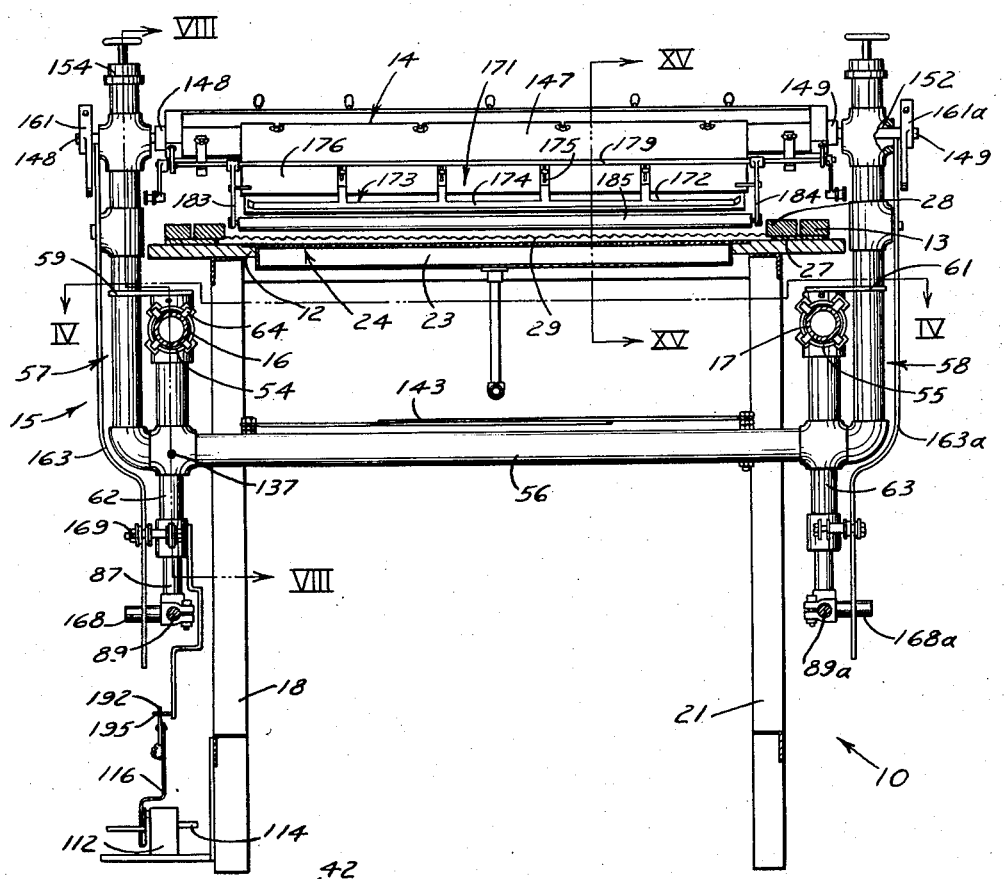
fig. 3
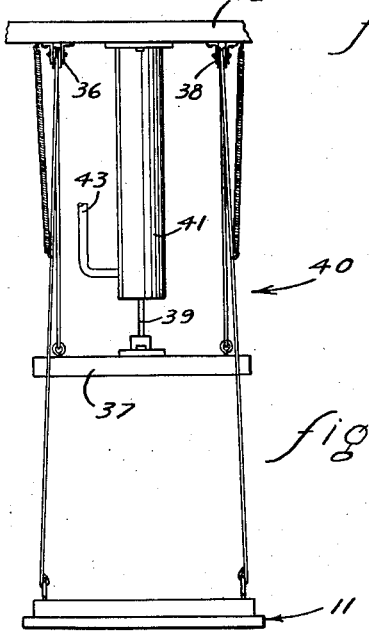
fig. 13
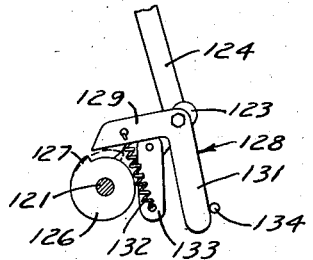
fig. 6
INVENTOR.
HOMER H. INGERSOLL
BY
ATTORNEY

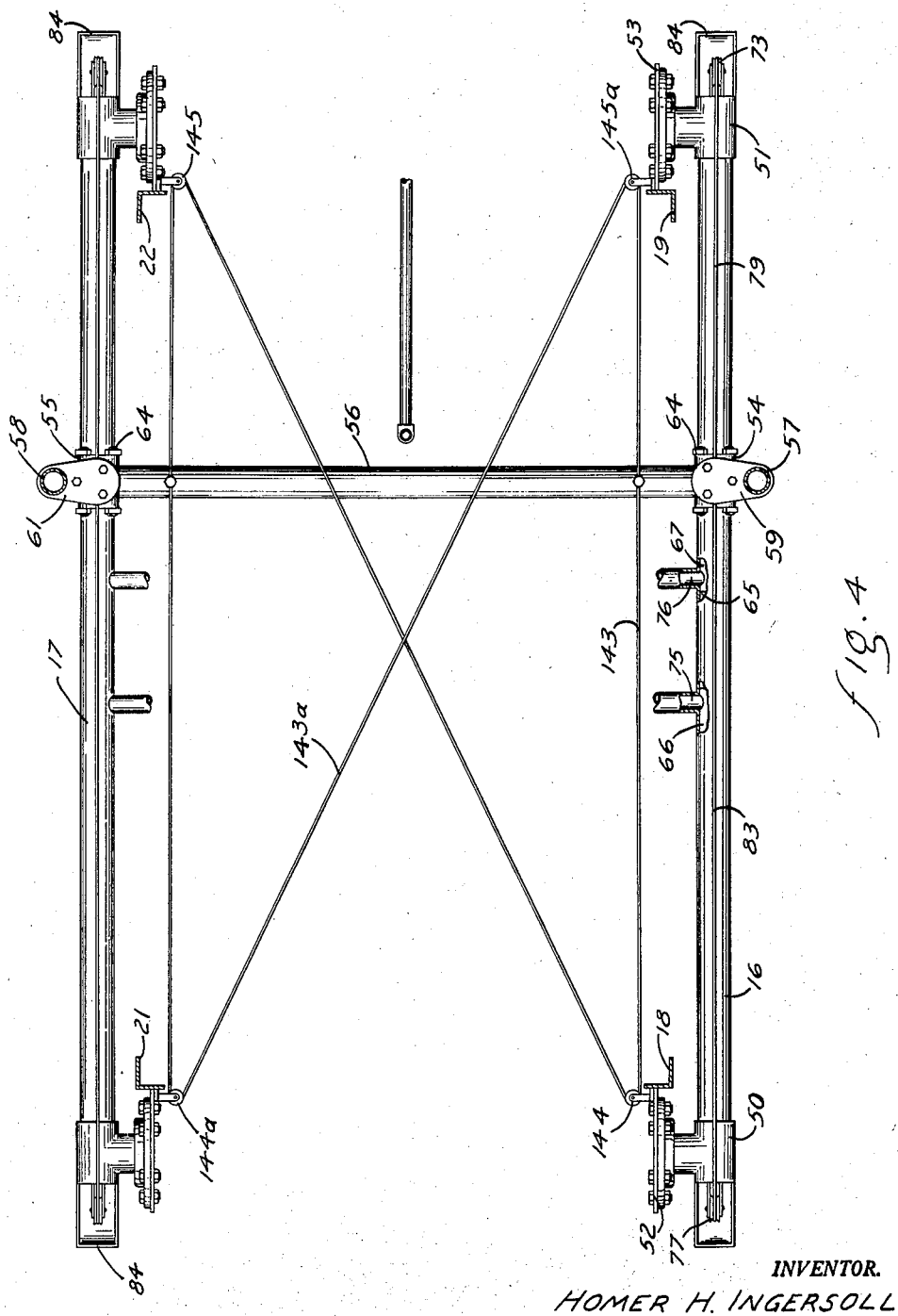

Sept. 9, 1958  H. H. INGERSOLL  2,850,969
SCREEN TYPE PRINTING MACHINE
Filed Feb. 17, 1955  9 Sheets-Sheet 5

INVENTOR.
HOMER H. INGERSOLL
BY
ATTORNEY

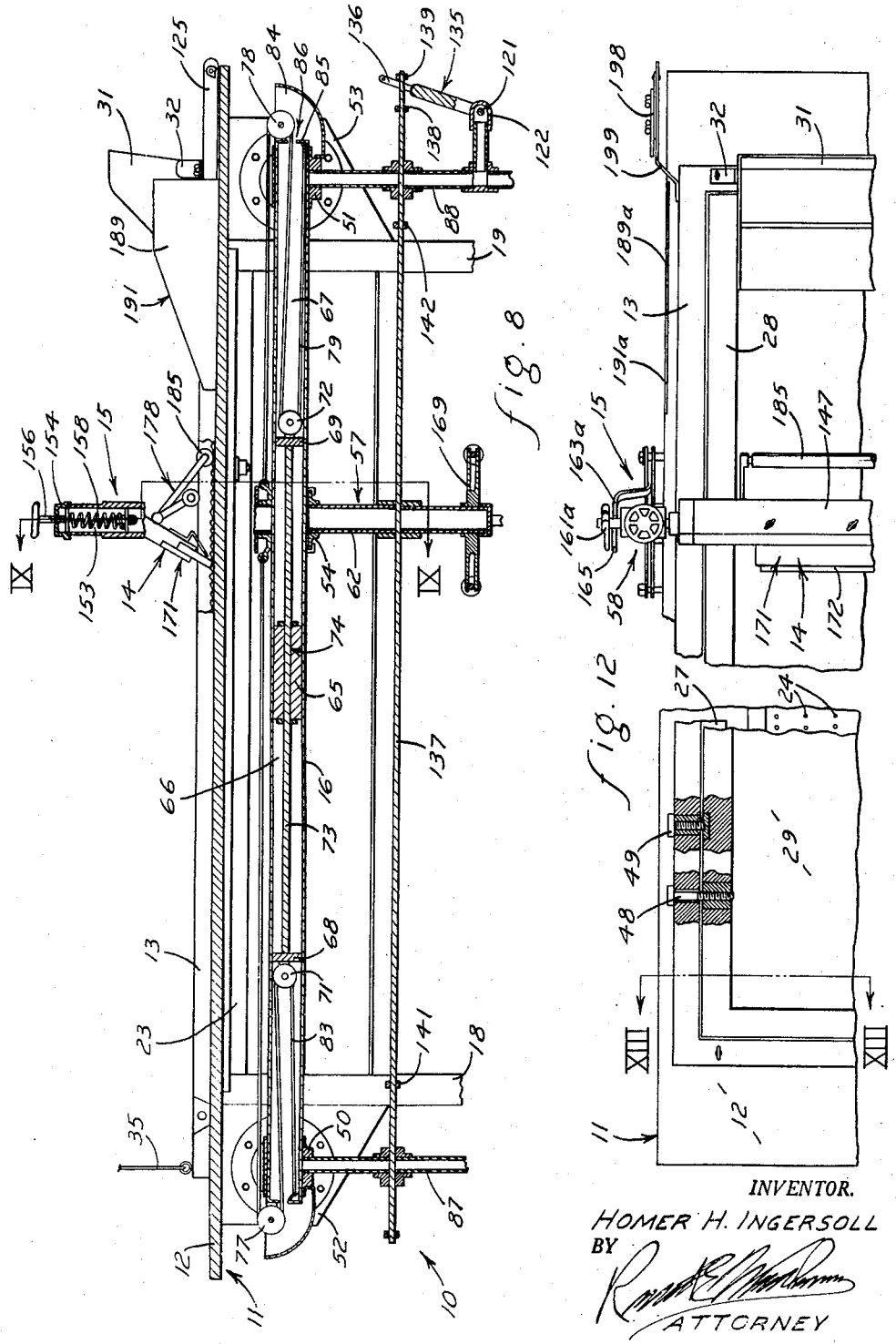

Sept. 9, 1958　　　H. H. INGERSOLL　　　2,850,969
SCREEN TYPE PRINTING MACHINE
Filed Feb. 17, 1955　　　　　　　　　9 Sheets-Sheet 7
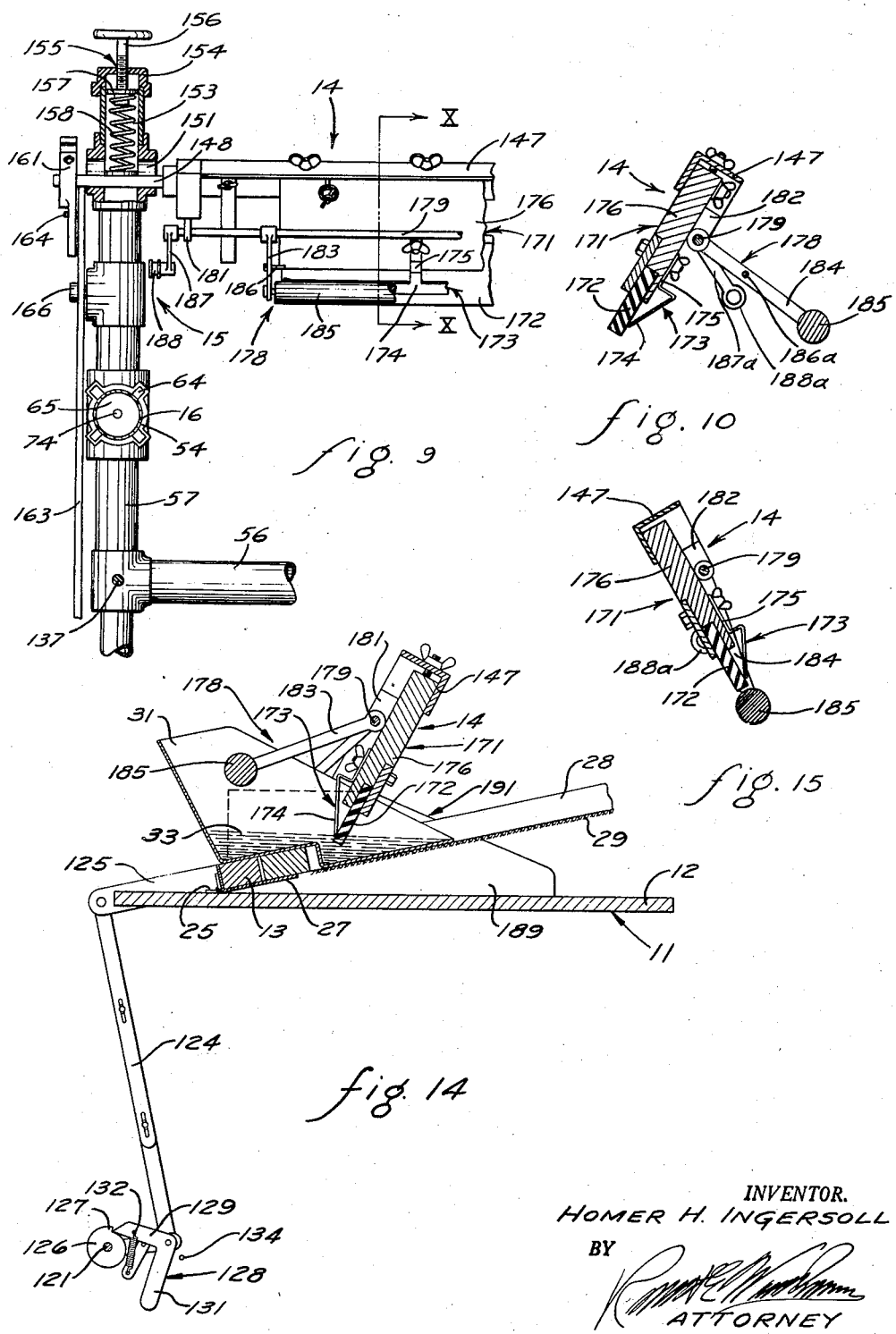
INVENTOR.
HOMER H. INGERSOLL
BY
ATTORNEY Sept. 9, 1958    H. H. INGERSOLL    2,850,969
SCREEN TYPE PRINTING MACHINE
Filed Feb. 17, 1955    9 Sheets-Sheet 8

INVENTOR.
HOMER H. INGERSOLL
BY
ATTORNEY

Sept. 9, 1958  H. H. INGERSOLL  2,850,969
SCREEN TYPE PRINTING MACHINE
Filed Feb. 17, 1955  9 Sheets-Sheet 9
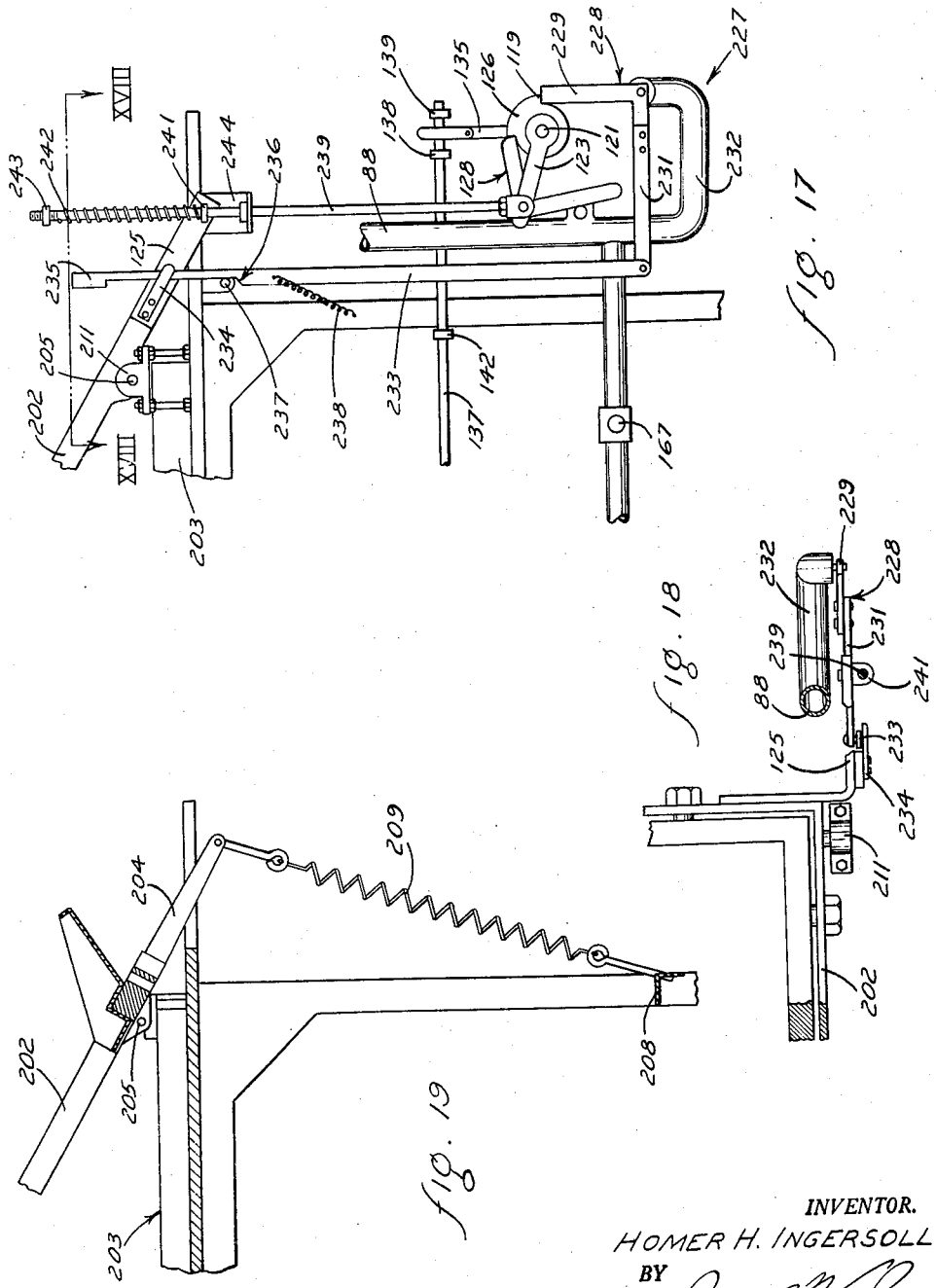
INVENTOR.
HOMER H. INGERSOLL
BY
ATTORNEY United States Patent Office 2,850,969
Patented Sept. 9, 1958

2,850,969

SCREEN TYPE PRINTING MACHINE

Homer H. Ingersoll, Kalamazoo, Mich., assignor to Meyercord Company, Chicago, Ill., a corporation of Illinois Application February 17, 1955, Serial No. 488,876

19 Claims. (Cl. 101—126)

This invention relates in general to a screen type printing machine and more particularly to a type thereof having a printing table with a substantially horizontal top and a screen frame hingedly mounted upon said top near one edge thereof.

Although silk screen printing machines are known to have been in existence for several centuries, many of the ones used today are substantially identical to those originally conceived and developed. Such a machine is comprised of a table having a substantially horizontal top with a chase or outer frame pivotally supported along one edge thereof upon said table top for movement upwardly out of, and downwardly into, a position substantially parallel with and adjacent to said table top. An inner, screen frame is removably disposed within said chase. Means is provided for raising and lowering said chase and the printing liquid, such as lacquer, is manually applied along said screen with an applicator having a flexible squeegee along the lower edge thereof.

Several successful, silk screen printing machines have been developed in recent years for high speed production of large quantity orders. However, these machines have a very high initial cost, they are relatively complicated to operate, they require at least two and sometimes four or more operators per machine and they cannot be economically operated for small to medium sized orders. The reason for this latter fact is, in substance, that changing the printing screen in these machines is a complicated task and requires a skilled technician, and the several persons required to operate the machine must, as a rule, remain idle while the screen is being changed.

Thus, the owner of the average medium sized and/or small screen printing establishment, is presently forced to use the centuries old, manually operated silk screen printing machine which results in a non-competitive, high unit cost, product or he must use the above-mentioned high speed production type machine in an equally inefficient manner.

The fact that no successful, fully automatic machine has been developed for efficient and economical use regardless of the quantity of the output desired arises from a variety of reasons and factors characteristic of this type of process. Several of these factors have been mentioned above and others include the fact that the printing materials, such as lacquer, which are used in this process are highly flammable and, therefore, cannot be safely used near electrical machinery. Furthermore, the liquids used in the printing process will smear if the sheets to which they are applied are not carefully handled following the application of the liquid. As a result, the printed sheets must be placed on racks where each sheet is separated from the others until dry. Also, it is a well known fact that the physical characteristics of the liquid, such as lacquer, being used in the printing process and the paper upon which said lacquer is applied will vary with the weather. Thus, any automatic machine for applying the screen printing process must be constructed so that it can be quickly adjusted to compensate for such variations.

Accordingly, a primary object of my invention has been the provision of a fully automatic, screen printing machine which can efficiently and economically handle small quantity requirements as well as mass production requirements, which has no electrical devices or the like to create fire hazards with the flammable type of liquids used in these machines, and in which adequate and accurate adjustments can be made to compensate for changes in the physical characteristics of the printing liquid and/or changes in the sizes or shape of the sheets being printed and the printing screen by which the liquid is applied to the material.

A further object of this invention is the provision of fully automatic printing machine, as aforesaid, whereby a single operator can load, unload and rack the sheet material being printed during the normal operating cycle of the machine, and wherein any fatigue suffered by the operator during long periods of operation will not be reflected by an inferior product of the machine as is the case with the presently used, manually operated type of printing machine.

A further object of this invention is the provision of a machine, as aforesaid, wherein the printing operation or cycle can be started and/or stopped as desired or required and can be varied in speed and character quickly and easily by unskilled operators.

A further object of this invention is the provision of a machine, as aforesaid, which can be easily and simply loaded, unloaded, adjusted or set up for a completely different job by persons of no particular technical skill, which can be operated by persons of average strength and dexterity, and wherein there are no hazardous operations which could injure the operator.

A further object of this invention is the provision of a machine, as aforesaid, having a liquid applicator provided with means whereby liquid is positively prevented from dribbling off of the applicator during the non-printing stroke thereof, thereby preventing damage to the finished product caused by such dribbling.

A further object of this invention is the provision of a machine, as aforesaid, having a device for moving the liquid applicator along the printing machine in positive but smooth manner, and having a chase or outer frame provided with means for adjusting the inner or screen frame therewithin and laterally thereof.

Other objects and purposes of this invention will become apparent to persons familiar with this type of equipment upon reading the following specification and examining the accompanying drawings, in which:

Figure 2 is an end elevation of the rightward end of said machine as appearing in Figure 1.

Figure 3 is a sectional view taken along the line III—III of Figure 1.

Figure 4 is a sectional view taken along the line IV—IV of Figure 3.

Figure 5 is a sectional view taken along the line V—V of Figure 2.

Figure 6 is a sectional view taken along the line VI—VI of Figure 5.

Figure 7 is a fragment of said machine indicated by the line VII—VII in Figure 5.

Figure 8 is a sectional view substantially as taken along the line VIII—VIII of Figure 3.

Figure 9 is a sectional view substantially as taken along the line IX—IX of Figure 8.

Figure 10 is a sectional view taken along the line X—X of Figure 9.

Figure 12 is a fragmentary, broken top plan view of the machine.

Figure 13 is an end elevation view of the leftward end of said machine, as appearing in Figure 1.

Figure 14 is a fragment of said machine near the rightward end thereof.

Figure 15 is a sectional view taken along the line XV—XV of Figure 3.

Figure 17 is a fragmentary showing of a portion of said alternate machine corresponding to the rightward end of the machine shown in Figure 1.

Figure 18 is a broken sectional view substantially as taken along the line XVIII—XVIII of Figure 17.

Figure 19 is another fragment of said alternate machine similar to the fragment thereof shown in Figures 16 and 17.

Figure 1:
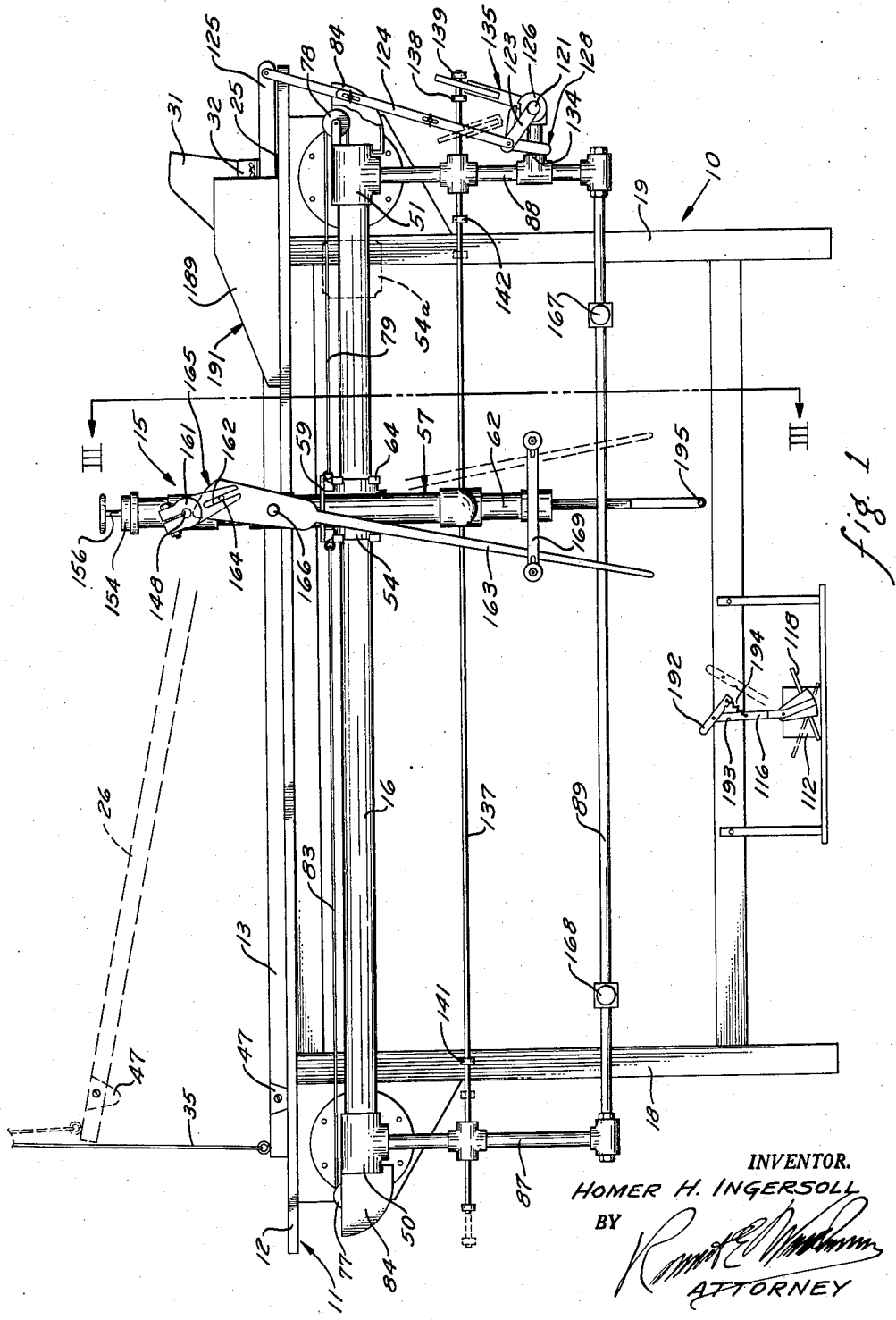
Figure 1 is a side elevation view of a printing machine embodying my invention, but not including the hydraulic system thereof.

In meeting the objects and purposes set forth above, as well as others related thereto, I have provided a screen type printing machine 10 (Figures 1 and 2) having a table 11 with a substantially horizontal top 12 upon which an outer frame or chase 13 is hingedly secured along one edge thereof for movement upwardly out of, and downwardly into, a position parallel with and adjacent to said top 12. An applicator 14 is pivotally supported above the chase 13 by traverse structure 15 which is slidably supported upon the parallel, horizontal rails 16 and 17 for movement in a direction parallel with said table top 12 and perpendicular to the pivotal axis of the chase 13. Fluid actuated means is provided for urging the traverse structure leftwardly, as appearing in Figure 1, when the chase 13 is moved into its said parallel position and for reversing the movement of said traverse structure 15 when said structure reaches the leftward end of its stroke.

For the purposes of convenience in description, the terms "upper," "lower," "leftward," "rightward," "front," "rear," and derivatives thereof, will have reference to my machine in its normal manner of use and as appearing in Figure 1. The terms "inner" and "outer" will have reference to the geometric center of my machine and/or parts associated therewith.

*Detailed construction*

As shown particularly in Figures 1, 2, 11, 12 and 13, my machine 10 is comprised of a table 11 supported by legs 18, 19, 21 and 22 located near the four corners of the rectangular top 12. The center portion of the top 12 may be provided with a vacuum chamber 23 having openings 24 (Figure 3) in the upper wall thereof, which wall is flush with the upper surface of the table top 12. The purpose of the chamber 23 will become apparent hereinafter.

A chase or outer frame 13 having a rectangular shape is pivotally secured, as by means of the hinges 25, at the rightward end thereof upon the table top 12 for movement about the axis of said hinges out of and into the position parallel with, and adjacent to, the table top 12, as shown in Figure 1. Said chase 13 is indicated in broken lines 26 (Figure 1) in its raised position. The chase 13 (Figures 3 and 12) has an inwardly extending flange 27 along the lower side thereof for supporting a screen frame 28 having a silk screen 29 located thereon in a substantially conventional manner.

A liquid fount or trough 31 (Figures 1, 2, 12 and 14) is removably secured by means of the fount brackets 32 upon the rightward end of the chase 13 for holding a supply of liquid 33, such as lacquer or the like, adjacent to the screen frame 28 and accessible to the applicator 14. The exact size and shape of the fount 31 are not critical providing they meet the above-mentioned requirements.

A pair of spaced, lift cables 34 and 35 of the lift mechanism 40 (Figures 1, 11 and 13) are secured in any convenient manner to the leftward end of the chase 13 near the respective corners thereof. Said cables extend upwardly and around the pulleys 36 and 38, respectively, and then downwardly to engage the opposite ends of a counterweight bar 37. Said bar 37 is secured intermediate its ends to the lower end of the vertically reciprocable piston rod 39 of a hydraulic actuator 41. The pulleys 36 and 38, and the hydraulic actuator 41 are secured to suitable means such as a ceiling member 42.

A source of fluid under pressure, such as air (not shown), is connected to the actuator 41 by means of a conduit 43 for retracting the piston 39. Resilient means in the form of a pair of coiled springs 44 may be secured to said ceiling member 42 and a point 45 on each of the cables 34 and 35 between said pulleys and said chase 13. Thus, said springs will be stretched by downward movement of the chase, thereby resisting and cushioning such downward movement and lifting said chase when the pressure applied to said actuator 41 is released. It will be apparent that the specific lift mechanism 40 disclosed hereinabove may be replaced by a variety of structures without departing from the scope of this invention.

The chase 13 (Figure 1) may be provided with one or more guide ears 47 extending downwardly therefrom and receivable into appropriate slots (not shown) in said table top 12 for effecting proper and accurate registry of said chase as it moves into said lower, parallel position. A plurality of spaced bolts 48 and 49 (Figure 12) may be provided for adjusting the position of the screen frame 28 with respect to the chase 13. In this particular embodiment, the bolts 48 draw the screen frame 28 toward the chase 13 whereas the bolts 49 urge the screen frame away from the chase frame.

The rails 16 and 17 (Figures 1, 3, 4 and 8) are disposed parallel to each other on opposite sides of the table 11 adjacent to, parallel with and beneath front and rear edges of the top 12 of said table. The front rail 16 is mounted at the opposite, lengthwise ends thereof by means of the support fixtures 50 and 51 upon the bracket plates 52 and 53 which are secured to the legs 18 and 19, respectively. The rear rail 17 is supported by the legs 21 and 22 in a similar manner (Figure 4). The rails 16 and 17 preferably, but not necessarily, support a substantially U-shaped traverse structure 15 (Figures 1, 2 and 3), by means of a pair of substantially identical rail riders 54 and 55, which have depending portions 62 and 63 between which, and to which, an interconnect bar 56 is secured at the opposite ends thereof.

A pair of parallel, upright elements 57 and 58 are secured at the lower ends of each to said depending portions 62 and 63 near the opposite ends of said interconnect bar. A pair of braces 59 and 61 secure the upper ends of the riders 54 and 55, respectively, to said upright elements 57 and 58. This particular structure permits the support elements 57 and 58 to extend above the lateral edges of the table top 12 whereas the rails 16 and 17 are disposed beneath said lateral edges. As shown in Figure 9, however, the riders 54 and 55 may be disposed along the vertical axes of the support elements 57 and 58, respectively. Each of said riders (Figure 3) may be provided with a plurality of rollers 64 at the opposite axial ends thereof, for example, to facilitate movement of said riders along their respective rails 16 and 17.

As shown in Figure 8 with respect to the rail 16, each of said rails 16 and 17 is provided with an internal partition 65 disposed mid-way between its opposite axial ends, thereby providing the left and right chambers 66 and 67, respectively. A pair of pistons 68 and 69 are slidably disposed in said chambers 66 and 67, respectively, and connected to the opposite ends of a tie rod 73 which slidably extends through a suitable opening 74 in the partition 65. The pistons 68 and 69 support the inner pulleys 71 and 72 upon the opposite remote faces thereof for rotation in substantially the same plane. The rod 73 causes said pistons 68 and 69 to move simultaneously the same distance within their respective chambers 66 and 67. A left port 75 and a right port 76 (Figures 4 and 11) are provided in and through the side wall of the rail 16 closely adjacent to the partition 65 for reasons appearing hereinafter.

Figure 11:
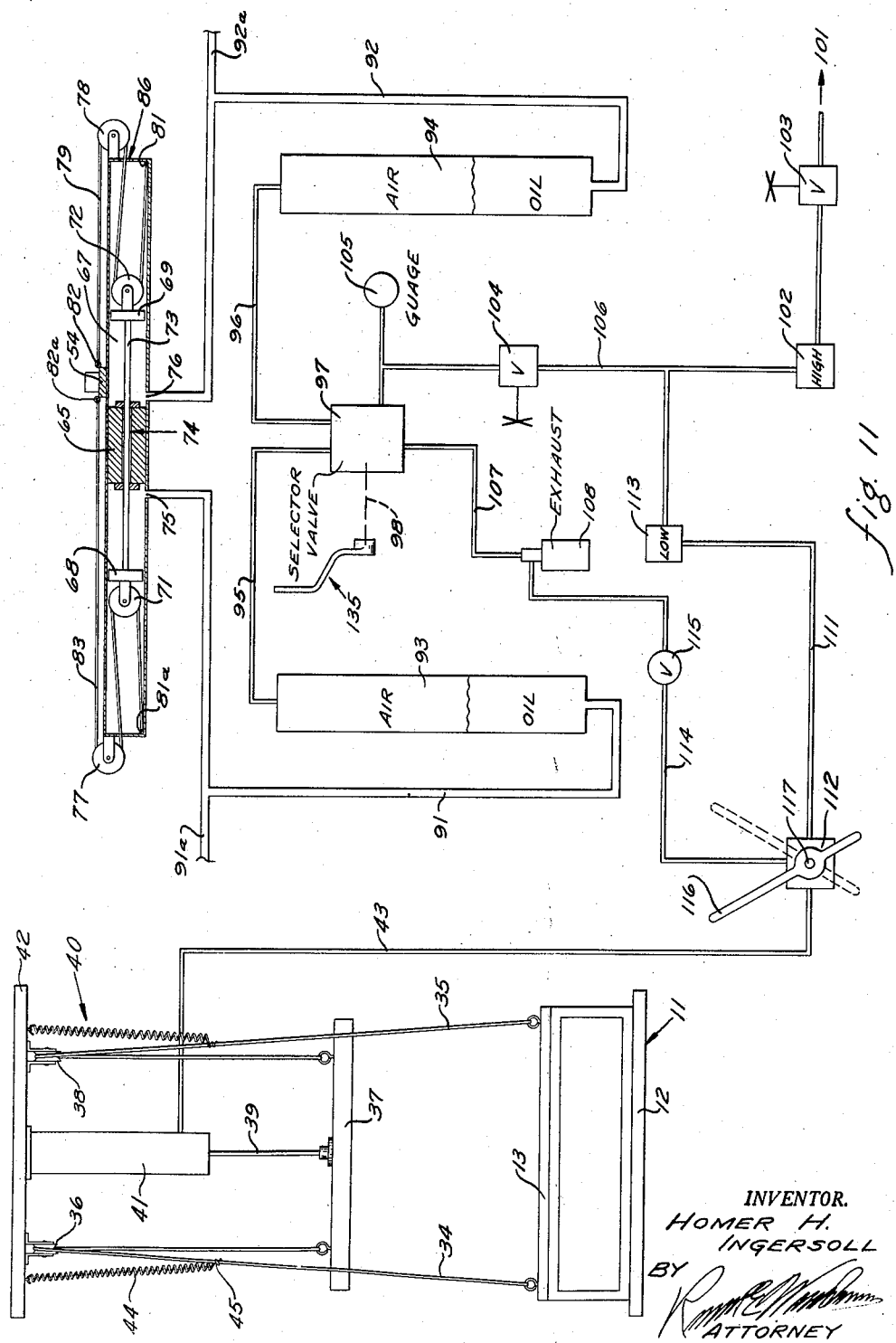
Figure 11 is a diagrammatic view of the fluid system of my invention including portions of the machine operated thereby.

As shown in Figure 11 a pair of outer pulleys 77 and 78 are rotatably supported at the opposite ends of said rail 16 for rotation substantially within the plane of said inner pulleys. Said outer pulleys are preferably so aligned and of such size that their peripheries extend above the upper surface of the rail 16 and the rail support fixtures 50 and 51 thereon. A cable 79 is secured at one end by any convenient means, such as the eye bolt 81, to the rightward end of the rail 16 and extends inwardly around the inner pulley 72, outwardly around the outer pulley 78 and inwardly along the outside of the rail 16 where its other end is secured to the rider 54 by any convenient means, such as the eye bolt 82. Another cable 83, which is preferably substantially identical with the cable 79, is secured to another eye bolt 81a at the leftward end of the rail 16 and extends inwardly around the inner pulley 71, outwardly around the outer pulley 77 and inwardly along said rail where its other end is secured to the rider 54, as by means of the eye bolt 82a.

The cables 79 and 83 are held taut so that any movement of the pistons 68 and 69 in one direction will be reflected in a simultaneous movement of the rider 54 in the opposite direction with respect to the axis of the rail 16. Due to the pulley arrangement herein disclosed, the rider 54 will move twice as far as either of the pistons 68 and 69, thereby permitting the use of a rail 16 which does not materially exceed, if any, the length of the table top 12.

Pulley guards 84 (Figure 8), having collector pans in the lower portions thereof, may be provided at opposite ends of the rail 16 and secured thereto in any convenient manner for surrounding the outer pulleys 77 and 78 and collecting any liquid which might escape from the chambers 66 and 67 along the cables 79 and 83. Each outer end of the rail 16 may, if desired, be provided with some type of end plate 85 (Figure 8) having a bushed opening 86 through which the cables extend.

Either or both of said rails 16 and 17 may be provided with the partition, pistons, pulleys, cables, and other associated parts discussed hereinabove with respect to the rail 16. Where such parts are provided in both rails, as in this particular embodiment of the invention, assemblies will preferably be substantially identical. Therefore, detailed description of the internal structure of the rail 17 is believed unnecessary.

A pair of parallel support posts 87 and 88 extend downwardly from, and are secured to, the rail support fixtures 50 and 51 at the opposite, remote ends of the rail 16. The lower ends of said posts 87 and 88 are connected to a substantially horizontal bar 89 (Figure 1) which is preferably substantially parallel with the rail 16 and directly therebelow.

The pistons 68 and 69 (Figure 11) are actuated by a liquid, such as oil and water, supplied through a pair of conduits 91 and 92 extending from the lower ends of a pair of pressure cylinders 93 and 94 located at the rightward end of the machine 10. Said conduits 91 and 92 communicate at their other ends with the chambers 66 and 67 of the rail 16 through the ports 75 and 76, respectively. As in the description of the interior of the rails 16 and 17, the rail 16 will be used for illustrative purposes only, to describe the hydraulic system of my invention, such being applicable in a similar manner to the rail 17.

The upper ends of the pressure cylinders 93 and 94 are connected by the conduits 95 and 96, respectively, to a rotary actuated selector valve 97 having a substantially horizontal actuating shaft 98 extending therefrom. The valve 97, which is mounted upon the table 11 by any convenient means, such as the bracket 99, is, in this particular embodiment, designed to operate with a gas, such as air. Thus, each of said pressure cylinders 93 and 94 contains a liquid in the lower portion thereof and a gas in the upper portion thereof, there being enough liquid in each of said cylinders to effect a complete actuation of its corresponding pistons 68 and 69 in said rails 16 and 17 without draining all of the liquid from either cylinder and thereby permitting the gas to enter the conduits 91 and/or 92. This air and liquid combination provides a positive action with a cushion, which is not available where either of the two fluids is used separately.

The selector valve 97 (Figures 2 and 11) is connected by a conduit 106 to a source 101 of air pressure through a high pressure control valve 102 which, in this particular embodiment, places a limit of approximately 80 pounds per square inch upon the air passing through the selector valve 97 into the upper ends of the pressure cylinders 93 and 94. Manually operable gates 103 and 104 may be disposed in said conduit 106 between the source 101 and the high pressure valve 102, and between the high pressure valve 102 and the selector valve 97. A gauge 105 may be connected to conduit 106 between gate 104 and valve 97. An exhaust conduit 107 leads to an exhaust muffler 108 from the selector valve 97 whereby air pressure can escape from that one of said pressure cylinders 93 and 94 being exhausted.

Although not pertinent to the operation of the pistons 68 and 69, the hydraulic system disclosed in Figure 11 also includes a conduit 111 leading from the conduit 106 between the high pressure valve 102 and the gate 104 to a manually controlled, rotary valve 112 which is also connected to the conduit 43 leading to, and communicating with, the lower end of the hydraulic actuator 41 for retracting the piston rod 39 thereinto. A low pressure control valve 113 is connected in the conduit 111 for limiting the pressure passing through the rotary valve 112 to approximately 20 pounds per square inch in this particular embodiment. The rotary valve 112 is provided with an exhaust conduit 114 passing through a manually controllable, exhaust valve 115 to the exhaust muffler 108. A manually actuable lever 116 (Figures 1 and 11) is mounted on the rotary shaft 117 of said rotary valve 112 for rotation about a horizontal axis. In this particular embodiment, said lever 116 is actuated by a foot pedal 118.

The rotary valve shaft 98 (Figures 2 and 5) extends toward the front of the machine 10 from the selector valve 97 where it is coupled in a conventional manner to a co-axial line shaft 121 which is rotatably supported intermediate the ends thereof by means of a bearing 122 mounted upon the rightward support post 88 intermediate its upper and lower ends. A pivot arm 123 (Figures 1, 2, 6, 7 and 14) is pivotally supported upon the frontward end of the line shaft 121. The other end of said arm 123 is pivotally connected to the lower end of an adjustable link bar 124 whose upper end is pivotally secured to the outer rightward end of a lever bar 125 rigidly secured to the chase 13 and extending rightwardly therefrom and substantially parallel therewith. Thus, movement of the chase 13 about its hinge axis will effect corresponding upward and downward movement of the arm 123 about the line shaft 121.

A ratchet wheel 126 is secured upon the line shaft 121 for rotation therewith adjacent to the arm 123, said ratchet being provided with a single tooth 127 (Figures 6 and 7). An L-shaped pawl 128 is pivotally supported at the intersection of its legs 129 and 131 upon the arm 123 near the outer end thereof for rotation about an axis substantially parallel with the line shaft 121. The upper leg 129 of the pawl 128 extends substantially horizontally inwardly from the pivot point of said pawl toward, and for engagement with, the tooth 127 on the ratchet wheel 126. The lower leg 131 of said pawl 128 extends downwardly from said pivot point. Resilient means, such as the spring 132 (Figure 6), extends between the upper leg 129 and the lower end of a bar 133 rigidly secured to the arm 123 to urge said upper leg 129 downwardly against the periphery of the ratchet wheel 126, which is locked upon the shaft 121. The upper leg 129 of the pawl 128 is in engagement with the tooth 127 when the arm 123 is in its lower, Figure 7 position and the selector valve 97 is in neutral position, thereby blocking pressure to either and both pressure cylinders 93 and 94.

A disconnect pin 134 is mounted upon and extends frontwardly from the right support post 88 for engagement by the lower leg 131 of the pawl 128 when the arm 123 approaches its upper position shown in Figure 6, thereby disengaging the leg 129 from tooth 127. This arrangement permits counterclockwise rotation of the ratchet wheel 126 (Figure 1), hence the line shaft 121, without interference from the pawl 128 by means and for purposes discussed in detail hereinafter.

The ratchet wheel 126 (Figure 7) may be provided with a stop notch 119 which is disposed along the periphery of the ratchet wheel approximately 90 degrees from the ratchet tooth 127 and which faces away therefrom. The stop notch 119 is snugly engageable by a bend in the leaf spring 120 for resiliently resisting clockwise rotation of the ratchet wheel 126, as shown in Figure 7, when the crank arm 135 is in the neutral position. The leaf spring 120 is mounted as convenient on the frame of the machine.

A crank arm 135 (Figures 1, 2, 5 and 7) is secured to the line shaft 121 intermediate the selector valve 97 and the line shaft bearing 122 and extends vertically upwardly therefrom when said selector valve 97 is in said neutral position. The upper end of said arm 135 is provided with an elongated slot 136 through which one end of a substantially horizontal shift rod 137 is slidably received. Said shift rod 137 is axially slidably supported upon the support posts 87 and 88 beneath and substantially parallel with the rail 16. Said shift rod 137 slidably extends through an appropriate opening in said depending portion 62 (Figure 8) of the rider 54. A pair of collars 138 and 139 (Figures 1 and 7) are adjustably mounted on the rightward end of the shift rod 137 in a conventional manner on opposite sides of the crank arm 135, both said collars being rightwardly of the support post 88. Another pair of collars 141 and 142 are adjustably secured upon the shift rod 137 between the support posts 87 and 88. The collars 141 and 142 are engageable by the depending portion 62 of the rider 54 to shift the shift rod 137 and thereby operate the selector valve 97 through the crank arm 135 and the line shaft 121 in a manner and for purposes hereinafter discussed in detail.

In this particular embodiment, engagement between said depending portion 62 and the left collar 141 will effect a movement of the crank arm 135 from the solid line to the broken line position thereof as shown in Figure 1. Engagement of said depending portion 62 with the rightward collar 142 will effect a movement of the crank arm 135 from the broken line position of Figure 1 to the neutral position thereof shown in Figure 7. When the crank arm 135 is in the solid line position of Figure 1, the selector valve 97 (Figure 11) permits gas to pass through the conduit 95 into the front cylinder 93. With the crank arm 135 in the broken line position shown in Figure 1, the selector valve 97 directs gas through the conduit 96 into the rear pressure cylinder 94. When the crank arm 135 is in the neutral position (Figure 7), the selector valve 97 prevents gas from entering either the conduit 95 or the conduit 96. When the selector 97 is directing gas into one of the conduits 95 or 96, the other conduit is directly connected through said selector 97 to the exhaust conduit 107. This permits gas to escape from the cylinder not connected to the air pressure source 101 and thereby makes room for the liquid being returned to such cylinder from the rails. Corresponding chambers in said rails 16 and 17 are preferably and simultaneously connectable to the same pressure cylinder.

A liquid applicator 14 (Figures 1, 3, 9 and 10) is pivotally supported between and upon the upper ends of the support elements 57 and 58 of the traverse structure for pivotal movement about a horizontal axis traverse of the rails 16 and 17. Said applicator is comprised of a horizontal, elongated center bar 147 and a pair of coaxial stub shafts 148 and 149 extending from the opposite ends of said center bar 147. Said support elements 57 and 58 of the structure 15 are provided with vertically elongated, co-axial openings 151 and 152 through which the stub shafts 148 and 149, respectively, extend for rotatably supporting said applicator 14. Each of the support elements 57 and 58, as shown in Figure 9 with respect to the support element 57, is provided with a vertically cylindrical chamber 153 enclosed at its upper end by a cap 154 having a threaded central opening 155 through which a screw stem 156 is threadedly received into said chamber 153. The lower end of said stem 156 has means, such as a disk 157, bearing against the upper end of a spring 158 engaged at its lower end by the stub shaft 148. Thus, by appropriate adjustment of the screw stem 156, the resistance of the spring 158 to upward movement of the stub shaft 148 may be varied as desired or required.

A toggle arm 161 is rigidly secured near one end to the stub shaft 148 and is bifurcated at the other end to provide an open end slot 162. A cammed crank 163 is pivotally mounted near its upper end upon the support element 57, directly below the front stub shaft 148 and rearwardly of the toggle arm 161, for movement about an axis 166 parallel with the axis of said stub shaft 148. A toggle pin 164 extends from, and is secured to, the front face of the cammed crank 163 between its pivot axis 166 and its upper end, said pin being received into the slot 162 in said toggle arm 161. Thus, pivotal movement of the cammed crank 163 acting through the toggle arm 161 affects oscillation of the center bar 147 of the applicator 14 about its lengthwise axis. The upper edge of the cammed crank 163 is provided with an arcuate, cammed surface 165 which surface is further from the pivot axis 166 at its leftward than its rightward end. Thus, pivotal movement of the crank 163 into the solid line position shown in Figure 1 effects an upward movement of the stub shaft 148, which is engaged by said cammed surface 165, and movement of said crank 163 into the rightward, broken line position of Figure 1 permits said stub shaft 148 to drop into its lower position. Accordingly, leftward movement of the lower end of the crank 163 causes the lower edge of the applicator 14 to be moved rightwardly and upwardly, whereas rightward movement of the lower end of the crank 163 causes the applicator 14 to be moved leftwardly and downwardly.

The leftward and rightward movement of the lower end of the crank 163 is effected by engagement thereof with the rightward and leftward shift pins 167 and 168, respectively (Figures 1 and 3), which are mounted upon, and extend forwardly from, the bar 89 extending between the lower ends of the support posts 87 and 88. Means such as the bracket 169 supported upon, and extending downwardly from, the support element 57 is provided for limiting the movement of the crank 163 about its pivotal axis 166.

As shown in Figures 2 and 3, a toggle arm 161a, a crank 163a, and bar 89a, mounting shift pins 167a and 168a, may be provided on the rearward side of the machine 10 substantially identical in shape and function to their above disclosed counterparts located on the frontward side of said machine.

The liquid applicator (Figures 3, 9 and 10) includes a squeegee 171 comprised of a rigid plate 176 mounted upon the center bar 147 and a resilient, screen engaging element 172 removably secured to the lower edge of said plate 176. A liquid trap 173 is provided and supported on the rightward side of the squeegee 171 for catching and holding liquid, such as lacquer contained in the fount 31, adjacent to the resilient element 172. The liquid trap 173 is comprised of an elongated, horizontal strip 174 fabricated from a relatively rigid material, such as stainless steel, held against, and at an angle to, the resilient element 172 by means of support brackets 175 secured to the strip 174, extending upwardly therefrom and adjustably secured to the squeegee 171.

In certain uses of the applicator 14, it is essential that liquid held within the liquid trap 173 be positively prevented from leaking out during the leftward stroke of the applicator, when it is not in engagement with the screen 29. To carry out this purpose I have provided an anti-dribble device 178 (Figures 8, 9, 10, 14 and 15) having a support shaft 179 rotatably supported parallel with and below the axis of the stub shafts 148 and 149 by means of bearings 181 and 182 mounted upon, and depending from, the opposite ends of the center bar 147. A pair of roller arms 183 and 184 are secured to the shaft 179 adjacent to the opposite ends of the rigid plate 176 and extend therefrom in parallel relationship to rotatably support at, and between, their outer ends a roller 185. A pair of positioning pins 186 and 186a are secured to the arms 183 and 184, respectively, and extend inwardly and co-axially therefrom, for engagement with the rightward side of the rigid plate 176, near said ends thereof, to position the roller 185 directly below the lower edge of the resilient element 172, and parallel therewith, when the applicator 14 is pivoted into the rightward position shown in Figure 15. A pair of cranks 187 and 187a are secured to, and extend radially in the same direction from, the opposite ends of the support shaft 179 for movement therewith. A pair of co-axial cam followers 188 and 188a are rotatably mounted upon the outer ends of said cranks for rotation about an axis parallel with the support shaft 179. A pair of cams 189 and 189a, having identical rightwardly and upwardly sloping cammed edges 191 and 191a, are secured parallel with each other upon the opposite lateral edges of the table top 12 adjacent to the rightward end thereof for engagement by the cam followers 188 and 188a, respectively. Such engagement between said followers and said cammed edges effects an upward and rightward movement of the roller 185 as the applicator 14 approaches the rightward end of its stroke and is about to dip into the fount 31.

As shown in Figures 1, 2 and 3, the valve lever 116 extends upwardly from the rotary valve 112 for movement about a horizontal axis transverse of the rails 16 and 17. An extension element 192 is pivotally mounted intermediate the ends thereof upon the upper end of the lever 116 for movement about an axis parallel with the valve shaft 117. A pin 193 secured to the lever 116 prevents pivotal movement of the extension element 192 in a clockwise direction beyond a position of alignment with the lever 116, as shown in broken lines in Figure 1. A spring 194 resiliently resists counterclockwise movement of the extension element 192 from this position. A lever actuator 195 is secured to, and extends downwardly from, the depending portion 62 of the rider 54 for engaging the extension element 192. As the actuator 195 moves leftwardly, it causes the extension element 192 to be pivoted leftwardly against the tension of the spring 194 into the solid line position of Figure 1 thereby permitting the actuator 195 to pass. However, when the actuator 195 moves rightwardly, it causes the lever 116 to be moved into its rightward, broken line position of Figure 1 before the actuator 195 can pass thereby.

The vacuum chamber 23 (Figures 2 and 14) is connected by the conduit 196 to a source of suction pressure through a control valve 197 connected to and operable by linkage 198 connecting said valve 197 to a lever 199 secured to the chase 13 near the rightward end thereof.

In order to positively insure simultaneous movements of the riders 54 and 55 along the rails 16 and 17, respectively, a cable 143 (Figures 2, 3 and 4) is secured at one end to the interconnect bar 56 adjacent to the rider 54 and extends parallel with the rail 16 toward the leftward end thereof where it encircles an axially vertical pulley 144 which pulley is rotatably mounted upon the bracket 52 supported by the leg 18. Said cable 143 then extends diagonally and horizontally across and beneath the table top 12 to encircle another axially vertical pulley 145 mounted upon the leg 22 after which its other end is secured to the interconnect bar 56 adjacent to the rider 55. In substantially the same manner, another cable 143a extends from the interconnect bar 56 adjacent to the rider 55 around a pulley 144a mounted on the leg 21, around a pulley 145a mounted on the leg 19 and then to the interconnect bar 56 upon which it is secured adjacent to the rider 54. This arrangement positively prevents yawing or chattering of the applicator support structure 15 as it is moved along the rails 16 and 17.

*Alternate structure*

An alternate machine 201 is disclosed in Figures 16, 17, 18 and 19. Said alternate machine 201 is substantially similar, or identical to, the principal machine 10 (Figures 1 to 15, inclusive) except as disclosed hereinafter.

Figure 16:
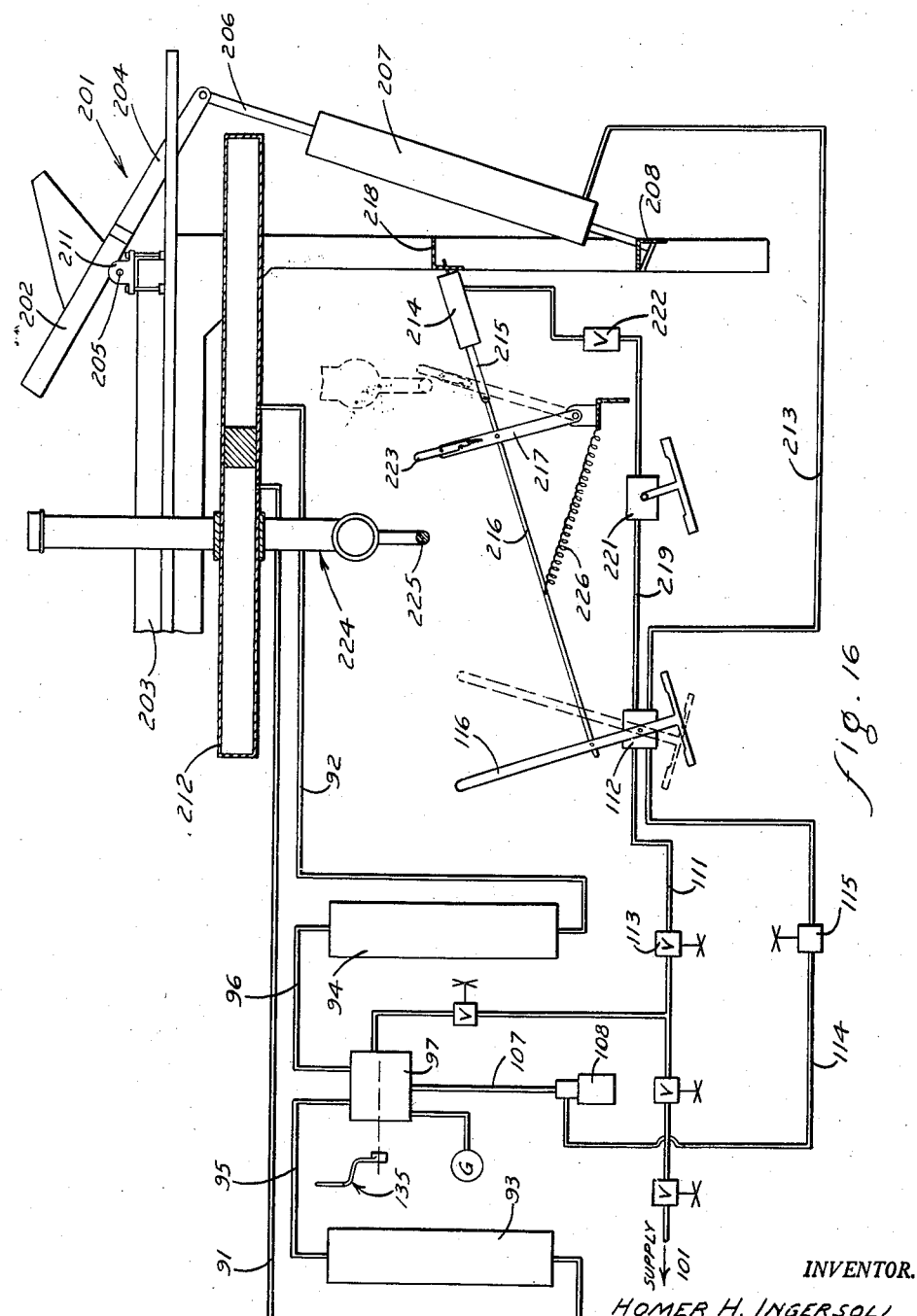
Figure 16 is a diagrammatic view of the fluid system of an alternate form of my machine including portions of said alternate machine.

In the first place, the alternate machine 201 is primarily designed for reception of the sheet material to be printed from the leftward end thereof, as appearing in Figures 16 and 17. As stated above, the machine 10 (Figure 1) is primarily designed for inserting the sheet materials to be printed from the front side thereof. As a result of such end feeding, the chase 202 of the machine 201 is substantially shorter than the chase 13 in the machine 10. Thus, it is mechanically and operationally advantageous to raise and lower the chase 202 out of and into, respectively, its position adjacent to the bed 203 of said machine 201 by means engaging the rightward end thereof.

The rightward end of the chase 202 (Figures 16 and 19) is provided with a plurality of parallel, lift arms 204 which are parallel with, and extend from the rightward end of, the chase 202 and are substantially perpendicular to the hinge pivot 205 of said chase 202. The upper end of the piston 206 of a hydraulic chase actuator 207 is secured to the rightward, free end of one of said lift arms 204, and the actuator 207 is secured at its lower end to a cross-member 208 which is in turn secured upon the lower part of the machine 201 preferably between a pair of legs thereof. At least one counterbalance spring 209 (Figure 19) extends between the rightward end of a lift arm 204 and the cross-member 208 and is secured thereto substantially parallel with the lengthwise axis of the actuator 207. Extension of the actuator piston arm 206, which causes the chase 202 to move from its raised position into its lowered position, is opposed by one or more counterbalance springs 209.

As particularly shown in Figures 17 and 18, the hinge pivot 205 of the chase 202 may be comprised of a pair of stub shafts supported by bearings 211 which are vertically adjustable with respect to the machine bed 203 to provide for both off-contact and on-contact printing.

Where it becomes necessary to provide a fully automatic machine, the hydraulic system may be modified from its Figure 11 form to the form thereof shown in Figure 16 and, for illustrative purposes only, adapted to the alternate printing machine 201. It will be recognized that the machine 10 can be adapted in a similar manner for fully automatic operation. That portion of the hydraulic system in Figure 16 located between the rail 212, the source 101 of fluid supply, and the manually actuable rotary valve 112 may be substantially identical to that shown in Figure 11 between the rail 16, the source 101 and the rotary valve 112. Thus, numerals used in Figure 11 with respect to this portion of the hydraulic system are repeated in Figure 16 for the sake of convenience. It will also be observed that the chase actuator 207 and the conduit 213 leading thereto from the valve 112 simply replace the hydraulic actuator 41 and the line 43 in Figure 11.

A hydraulic actuator 214 (Figure 16) is mounted upon the machine 201 and has an actuating arm 215 which extends toward the operating lever 116 of the valve 112. Said arm 215 is connected to the lever 116 by a link bar 216 so that extension and retraction of the arm 215 will effect an opening and closing, respectively, of the valve 112. The movement of the arm 215 in this embodiment is endwise, or leftwardly and rightwardly, of the machine 201 as appearing in Figure 16. A reset lever 217 is pivotally secured intermediate its ends at the junction of the link bar 216 and the actuating arm 215 and is pivotally mounted at its lower end upon a cross-member 218 mounted in any convenient, conventional manner, not shown, upon the lower part of the machine 201. Thus, movement of the actuating arm 215 will effect a pivoting of the reset lever 217 in the usual manner. A fluid line 219 connects the valve 112 to the rightward or extension end of the hydraulic actuator 214 through a control valve 221 and a combination metering and dump valve 222. A toggle element 223, which is substantially identical in structure and operation to the extension element 192 in the machine 10, is mounted on the upper end of the reset lever 217. The traverse structure 224, which may be substantially identical to the traverse structure 15 in the machine 10, is provided with a lever actuator 225 engageable with the toggle element 223 for moving the reset lever 217 from its solid line position to its broken line position (Figure 16). Resilient means, such as the spring 226, extending between the link bar 216 and the frame of the machine, tends to retract the actuating arm 215 and move the levers 116 and 217 into their rightward, broken line, positions. The dump valve 222 permits gas under pressure within the actuator 214 to escape therefrom when the actuating arm 215 is moved rightwardly by the lever actuator 225 engaging the reset lever 217. However, when fluid under pressure is permitted to pass through the line 219 and the valve 221 from the source of supply 101, said valve 222 acts as a timing valve, which can be preset as desired or required, and effects a slow, positive extension of the actuating arm 215 in a well known manner.

Figure 17 discloses an alternate, positive stop mechanism 227 to replace that represented by the stop notch 119 and cooperating leaf spring 120 shown in Figure 7. The stop mechanism 227 makes use of the stop notch 119 but also includes linkage operable by the chase 202 as disclosed hereinafter. A pivot member 228, having a vertical leg 229 and a horizontal leg 231 (Figures 17 and 18), is pivotally supported about a horizontal axis upon a bracket 232 mounted upon the machine 201. The upper end of the vertical leg 202 is snugly engageable with the stop notch 119 on the ratchet wheel 126 when the crank arm 135 is in the neutral position, as shown in Figures 7 and 17. The leftward or free end of the horizontal leg 231 is pivotally secured to a substantially vertical rod 233 which extends upwardly adjacent to, and above, the lever bar 125 secured to, and extending rightwardly from, the chase 202. A rod guide 234 (Figures 17 and 18) is secured to the lever bar 125 and slidably embraces the vertical rod 233 near the upper end thereof. Said rod 233 is provided with a downwardly facing stop 235 which is engageable by the rod guide 234 for lifting the vertical rod 233 as the lever bar 125 moves upwardly about the hinge pivot 205. A cam 236 is provided on the vertical rod 233 for engagement by a pin 237 for the purpose of disengaging the rod stop 235 from the rod guide 234 at a preselectable time. A resilient means, such as the spring 238, extends from the vertical rod 233 to the frame of the machine 201 for the purpose of holding the vertical rod 233 within the rod guide 234 and thereagainst so long as the cam 236 is not engaged by the pin 237. Thus, it will be seen that, as the chase 202 is lowered into its said horizontal position from its raised position (Figure 17), the rod guide 234 will engage the rod stop 236 thereby raising the vertical rod 233 and thereby releasing engagement between the vertical leg 229 of the pivot member 228 and the stop notch 119 on the ratchet wheel 126.

As in the case of the machine 10 the ratchet wheel 126 is secured to the line shaft 121 as is the crank arm 135. The pivot arm 123 is freely rotatable at its rightward end upon the line shaft 121. The leftward or free end of the pivot arm 123 (Figure 17) is pivotally secured to the lower end of an adjustable, link bar 239 which is similar in function to the link bar 124 in the machine 10. The upper end of the link bar 239 is loosely and slidably embraced by a collar 241 pivotally mounted upon the outer, free end of the lever bar 125. Said link bar 239 extends above the collar 241 and is encircled by a coil spring 242 above said collar 241 and below a collar 243 adjustably secured to the upper end of the bar 239. A support bracket 244 slidably embraces the link bar 239 below the collar 241 and is secured to the bed 203 of the machine 201. This arrangement permits the lever bar 125 to be moved upwardly while compressing the coil spring 242 without moving the pivot arm 123, hence without causing the pawl 128 to rotate the ratchet wheel 126. In the case of the machine 10 downward movement of the chase 13 produced upward movement of the lever bar 125 which was immediately reflected in upward movement of the pivot arm 123. However, as soon as the pivot member 228 is released from engagement with the stop notch 119, as described hereinabove, the compressed spring 242 will cause the ratchet wheel 126 to be rotated by the pawl 128. The stop mechanism 227 results in a delayed action of the rotation of the ratchet wheel 126 for the purpose of preventing accidental leftward movement of the traverse structure 224 along the machine 201 before the chase 202 reaches its lowered position.

*Operation*

At the beginning of an operating cycle, the usual physical disposition of the various operating parts of the machine 10 is as follows: the traverse, or applicator support, structure 15 is at the rightward end of the machine with the rider 54 thereof in the broken line position 54a of Figure 1. This places the cammed crank 163 in the solid line position of Figure 1, and the chase 13 in its raised, broken line position 26. The pivot arm 123 is in its lower position (Figure 7) and the crank arm 135 is in its substantially vertical position (Figure 7) with the pawl upper leg 129 engaging the tooth 127 on the ratchet wheel 126. The collars 141 and 142 secured to the shift rod 137 will be intermediate their solid and broken line positions shown in Figure 1. The valve lever 116 on the rotary valve 112 will be in its broken line position of Figure 1. The lift mechanism 40 (Figure 13) will be in the raised position. The liquid applicator 14 will be dipped in the liquid 33 in the fount 31 at the rightward end of the machine 10 and the anti-dribble roller 185 will be in its elevated position (Figure 14).

The operator places a sheet of material, not shown, upon the table top 12 in proper position for printing and then depresses the leftward side of the foot pedal 118 connected to the valve lever 116 (Figure 1), which moves the lever from its broken line to its solid line position. As indicated in Figure 11, such actuation of pedal 118 permits gas, such as air under pressure to flow from the source 101 through the conduit 111 and valve 112 into the conduit 43 leading to the hydraulic actuator 41 of the lift mechanism 40. This causes the piston rod 39 and counterweight bar 37 connected to the lower end thereof to be raised into their Figure 13 position. This permits the chase 13 to move downwardly into its solid line position in Figure 1 from its broken line position 26 while at the same time imposing a tension on the coiled springs 44 secured between the lift cables 34 and 35 and the ceiling member 42. The guide ears 47 direct the chase 13 into proper registration with the paper or similar material previously placed on the table top.

The speed with which the chase is moved downwardly into its solid line position in Figure 1 depends upon the pressure of the gas which is directed into the hydraulic actuator 41 and this pressure is determined by the low pressure control valve 113. As the chase 13 approaches its lower position (Figures 1 and 8), lever bar 125, secured to the rightward end of the chase 13, is pivoted around the axis of the hinges 25, thereby raising the link bar 124 and pivoting the pivot arm 123 upwardly about the axis of the line shaft 121. This upward movement of the pivot arm 123 causes the upper leg 129 of the pawl 128 to engage the tooth 127 on the ratchet wheel 126 thereby rotating the ratchet wheel 126, hence the line shaft 121, in a clockwise direction (Figures 1 and 7).

The stop notch 119 on the ratchet wheel 126 (Figure 7) is releasably and resiliently engaged by the leaf spring 120 to prevent accidental movement of the crank arm 135 rightwardly out of its neutral position prior to movement thereof caused by the pawl 128. The reason for this is to prevent movement of the traverse structure 15, hence the squeegee 171, leftwardly along the machine 10 until the chase 13 has come substantially within its horizontal position. Premature leftward movement of said squeegee 171 would result in damage to the silk screen 29. The crank arm 135 is thereby moved from the vertical position thereof shown in Figure 7 to its solid line rightward position shown in Figures 1 and 8. The upper end of the crank arm 135, which embraces the shift rod 137, engages the collar 139 and moves the shift rod 137, hence the collars 141 and 142 thereon, rightwardly into the solid line positions shown in Figure 1.

As the chase 13 approaches its horizontal position (Figure 8), the lower leg 131 of the pawl 128 engages the disconnect pin 134 (Figure 7) thereby moving the pawl upper leg 129 upwardly away from the ratchet wheel 126 and the tooth 127 thereon. Thus, when the ratchet wheel is subsequently rotated by actuation of the shift rod 137 and the crank arm 135, there will be no interference therewith by the pawl 128 provided the chase 13 remains in its lowered, horizontal position.

When the crank arm 135 is in its Figure 7 position, the selector valve 97 is in its neutral position thereby preventing the flow of gas from the source 101 into either of the conduits 95 or 96 leading from the selector valve 97. However, when the crank arm 135 is moved into its rightward position, the selector valve 97 directs the flow of gas from the source 101 through the conduit 96 and into the upper end of the pressure cylinder 94. This causes the liquid, such as oil, to be urged out of the pressure cylinder 94 through the conduit 92 and into the rightward chamber 67 (Figures 8 and 11) of the rail 16 thereby moving the pistons 68 and 69 rightwardly within said rail 16. The rider 54 is accordingly moved leftwardly with respect to said rail 16, as appearing in Figures 1, 8 and 11. A conduit 92a leading from the conduit 92 may be provided for effecting similar movement of rider 55 on the rail 17.

At the beginning of the leftward movement of the riders 54 and 55, hence of the entire structure 15, the cam crank 163 is in its solid line position of Figure 1, having been so positioned by the engagement of the lower end thereof with the shift pin 167 on the bar 89. As a result of the coaction between the toggle arm 161 and the toggle pin 164 on the upper end of the crank 163, the toggle arm 161, hence the liquid applicator 14, is in its rightward position as shown in Figure 15. The cam surface 165 at the upper end of cam crank 163 holds the stub shaft 148, hence the liquid applicator in the raised position at the beginning of said leftward stroke. Liquid 33, such as lacquer or the like, is collected from the fount 31 and held by the liquid trap 173 against the resilient element 172 of the squeegee 171 during the leftward movement of the liquid applicator along the machine 10.

It will be apparent from Figures 1, 2, 12 and 14 that the fount 31 may be removed from the chase 13 by disconnecting the fount brackets 32 from said chase.

Where the anti-dribble device 178 is used, it is positioned as shown in Figure 14 prior to the beginning of the leftward stroke. The roller 185 is held in a substantially raised position due to the engagement of the cams 189 and 189a by the cam followers 188 and 188a. As the liquid applicator 14 and the applicator support structure 15 move leftwardly away from the fount 31, the cam followers 188 and 188a move down the cammed edges 191 and 191a thereby permitting the roller 185 to move from its raised position into its lower position (Figures 3 and 15) beneath the lower edge of the element 172. Thus, the roller will intercept any drops of liquid 33 which drop from the resilient element and will prevent them from reaching the table top 12 during the leftward non-printing movement of the applicator 146.

As the applicator support structure 15 moves leftwardly (Figure 1) along the rails 16 and 17, the lever actuator 195 engages the extension element 192 extending upwardly from the valve lever 116 on the manual valve 112. Since the lever 116 was moved leftwardly by the initial depressing of the foot pedal 118, the extension 192 will be rotated counterclockwise by said lever actuator 195 against the resistance of the spring 194.

Just before the applicator support structure 15 reaches the leftward end of its stroke (Figure 1), the depending portion 62 of the rider 54 will engage the collar 141 thereby moving it from its solid line position of Figure 1 to its broken line position, thereby simultaneously moving the shift rod 137 leftwardly. At about the same time that the applicator support structure 15 engages the collar 141, the lower end of the cammed crank 163 will engage the shift pin 168 on the bar 89 thereby shifting the said crank 163 into its broken line position 163a. This causes the liquid applicator 14 to be tilted leftwardly (Figures 8 and 10) and dropped into engagement with the screen 29. At the same time, the anti-dribble device 178 is rotated rightwardly ahead of the liquid applicator 14 so that the roller 185 also engages the upper surface of the screen 29 rightwardly of the element 172. Thus, as the liquid applicator 14 is subsequently moved rightwardly any liquid 33 on the roller 185 will be applied to the screen 29 immediately in advance of the complete application of such liquid by the resilient element 172 of the squeegee 171. The slight time differential between the contact of the roller and the contact of the resilient element 172 will not have any material, disadvantageous affect upon the printing process, but will effect a cleaning of the roller prior to its use as an anti-dribble device during the leftward movement of the liquid applicator 14 in the next cycle of operation.

The precise point at which the cammed crank 163 is moved from its solid line position (Figure 1) to its broken line position 163a, or vice versa, will be determined by the position of the shift pins 167 and 168 upon the bar 89. These positions, which may be adjusted as desired or required, may be dependent upon the positioning of the adjustable collars 141 and 142 on the shift rod 137, said shift rod being the means by which the direction of movement of the applicator support structure 15 is determined and controlled.

As shown in Figures 8 and 9, the pressure of the resilient element 172 against the screen 29 may be adjusted by means of the screw 156 acting upon the spring 158 which bears against the stub shaft 148. A similar structure is associated with the support element 58 for urging the stub shaft 149, hence the rearward end of the liquid applicator 14, downwardly toward the table top 12.

When the shift rod 137 is moved into its leftward, broken line position (Figure 1) by engagement of the applicator support structure 15 with the left collar 141, the right collar 139 engages the crank arm 135 and moves it from its solid line position (Figure 1) to its broken line position. Such movement, acting through the line shaft 121, operates the selector valve 97. The selector valve 97 now directs the gas from the source 101 (Figure 11) through the conduit 106 and the conduit 95 into the top of the pressure cylinder 93. The liquid in said cylinder 93 is hereby urged through the conduit 91 into the left chamber 66 of the rail 16, where it actuates the pistons 68 and 69 leftwardly, thereby causing the structure 15 to move rightwardly. At the same time, the selector valve 97 connects the conduit 96 with the exhaust conduit 107 thereby permitting the gas in the pressure chamber 94 to escape as liquid is urged from the rightward chamber 67 of the rail 16 back through the conduits 92 and 92a into the pressure cylinder 94. A conduit 91a may be connected to the conduit 91 for actuating mechanism in the rail 17, similar to that described and disclosed with respect to the rail 16, for moving the rider 55 on said rail 17.

As the lever actuator 195 (Figure 1) moves rightwardly with said support structure 15, it engages the extension element 192 upon the valve lever 116 thereby moving the lever 116 into the broken line position of Figure 1. This causes the manual valve 112 to disconnect the source of gas 101 from the hydraulic actuator 41 and permit the gas under pressure within the actuator 41 to escape through the conduit 43, the manual valve 112 and the exhaust conduit 114. The controllable exhaust valve 115 permits the applicator support structure 15 to reach the rightward end of its stroke before the pressure is drained from the hydraulic actuator 41 thereby permitting the springs 44 and bar 37 to extend the piston rod 39 into its lowered position (Figure 11) thereby raising the chase 13 into its broken line position 26 (Figure 1). It will be apparent that the rightward actuation of the lever 116, which results in raising the chase 13, may be effected after the applicator support structure 15 has completed its rightward stroke. The particular embodiment here utilized is for illustrative purposes only. It will be obvious that in any case the applicator support structure 15 must reach the rightward end of its stroke with the liquid applicator 14 preferably above the fount 31 before the chase is moved into its broken line position 26 of Figure 1.

As the applicator support structure 15 approaches the rightward end of the machine 10, the pawl 128 is in the position shown in Figure 6, the ratchet wheel 126 is in the broken line position shown in Figures 6 and 7 and the right collar 142 on the shift rod 137 is in its broken line position of Figure 1. The collar 142 is moved rightwardly by the applicator support structure 15 into a position approximately mid-way between its broken and solid line positions shown in Figure 1, which causes the crank arm 135 and the ratchet wheel 126, rotatable therewith, to move into the solid line neutral positions shown in Figure 7.

The ratchet wheel 126 will be effectively prevented from going beyond its neutral position (Figure 7) by the engagement of the stop notch 19 with the leaf spring 120. The pawl 128, however, remains in its Figure 6 position until the chase 13 is raised into its broken line position 26 (Figure 1), as described hereinabove. Raising of the chase 13 operates through the lever bar 125, link bar 124 and pivot arm 123 to move the pawl 128 into the position shown in Figures 6 and 14 whereby the upper leg 129 is urged by spring 132 back into a position against the tooth 127, the lower leg 131 of said pawl having become disengaged from the disconnect pin 134 by the resulting downward movement of the pivot arm 123. The lower end of the cammed crank 163 is engaged by the shift pin 167 just before the applicator support structure 15 engages the right collar 142 and said crank is moved from its broken line position 163a to its solid line position 163 (Figure 1). This causes the applicator 14 to be moved into the rightward position shown in Figures 14 and 15 and simultaneously raises said applicator away from the screen for dipping into the fount 31. The anti-dribble roller 185 is raised clear to the fount 31 into the position of Figure 14 by engagement between the cam followers 188 and 188a with the cams 189 and 189a, respectively.

Movement of the crank arm 135 into the neutral position shown in Figure 7, places the selector valve 97 (Figure 11) into such a position that gas under pressure from the source 101 is prevented from passing into either the conduit 95 or the conduit 96. Thus, since the applicator support structure 15 has been moved to the rightward end of its stroke, it will remain there until a new cycle of operation is initiated by depressing the left side of the foot pedal 118. This, as before, is followed by downward movement of the chase 13 from its broken line position 26 into its solid line position (Figure 1) and another sequence of events identical with those just described. It will be obvious that this cycle of operation may be repeated as often as desired or required and the machine operator can initiate a complete cycle simply by depressing the foot pedal 118. Except for positioning and removing a sheet of material and depressing said foot pedal, the operation of the machine is completely automatic.

As shown in Figures 2, 3 and 14, means including the vacuum chamber 23, the suction control valve 197, the linkage 198, and the lever 199 on the chase 13 are provided for controllably holding sheet material to be printed firmly against the top 12 of the table 11 during the printing process. The suction valve 197 is operated through the linkage 198 by the lever 199 in response to upward and downward movement of the chase 13. Thus, the vacuum is created in the chamber 23 only when the chase is in its lowered position.

The valves 103 and 104 (Figure 11) provide means for isolating certain parts of the hydraulic system from the source 10 of gas under pressure. The bolts 48 and 49 mounted in the chase 13 (Figure 12) provide means for adjusting the screen frame 28 laterally within the chase 13 to effect proper registration of the pattern on the screen 29 or to compensate for variations in the pattern on its position due to weather conditions.

The operation of the alternate machine 201 differs from the above described operation of the principal machine 10 primarily in the following aspects: (1) the alternate machine is entirely automatic, (2) the chase raising and lowering mechanism is at the rightward end rather than at the leftward end of the chase 202 and, therefore, said machine 201 can be fed as effectively and efficiently from the leftward end as it can from its front side.

It will be recognized that the alternate stop mechanism 227, shown in Figures 17 and 18, and that portion of the actuating system shown in Figure 16 and providing for fully automatic operation are both applicable to the principal machine 10 as well as they are to the alternate machine 201.

Referring to Figure 16, it will be observed that the control valve 221 provides means for keeping the machine 201 in continuous operation, the valve 112 being opened and closed intermittently in the following manner. At the beginning of a cycle of operation, the chase 202 is in the raised position as indicated in Figure 16. The levers 116 and 117 are in their rightward, broken line positions so that the valve 112 is passing fluid from the source 101 through the line 111, the line 219 and the valve 222 to the rightward or extension end of the hydraulic actuator 214. Depending upon the setting of the valve 222, the fluid under pressure, such as a gas, is slowly metered into the actuator 214 thus slowly moving the lever 116 from its broken line position into its solid line position. During this period the operator of the machine 201 must remove any material therein from a previous printing and replace it with a new sheet of material. As soon as the valve 112 is moved by the lever 116 substantially into its solid line position, it permits fluid to flow through the line 111 and then through the line 213 into the chase actuator 207 whereupon the piston arm 206 causes the chase 202 to be lowered into its printing or horizontal position. By virtue of the operation of the stop mechanism 227 (Figure 17) the ratchet wheel 126 is released and the pawl 128 causes said ratchet wheel, hence the crank arm 135, to move rightwardly in a manner to start the operation of the traverse structure leftwardly along the machine 201, in a manner fully disclosed hereinabove with respect to the machine 10. As the traverse structure 224 moves leftwardly, the lever actuator 225 will engage the toggle element 223 causing it to be pivoted without having any effect upon the lever 217.

When the traverse structure 224 reaches the leftward end of its stroke it will be returned rightwardly in a manner set forth in detail hereinabove with respect to the machine 10. As the lever actuator 225 passes the reset lever 217 on its rightward movement, said lever 217 will be moved rightwardly thereby retracting the actuating arm 215 and causing the gas in the hydraulic actuator 214 to be dumped out through the valve 222 and simultaneously causing the valve 112 to be rotated into a position to permit the gas to flow through the line 219 again, but to cut it off from the line 213. The gas under pressure in the chase actuator 207 will bleed back through the valve 112, the line 114 and out through the exhaust muffler 108, thereby permitting the counterbalance springs 109 to raise the chase 202 into its raised position. This completes one cycle of operation which is continued immediately by the slow metering of gas under pressure through the valve 222 into the hydraulic actuator 214 hence causing the valve 112 to be shifted into a position where gas under pressure can flow through the line 213 into the chase actuator 207, as described hereinabove.

The stop mechanism 227, which is applicable to both forms of the printing machine disclosed in this application, provides for a delay action of the ratchet wheel 126, hence of the crank arm 135 and thereby prevents any possibility of the movement of the traverse structure 224, or its counterpart on the machine 10, leftwardly along the machine bed 203 until such time as the chase 202 has moved into a substantially horizontal position. This precaution protects the screens held by the chase from damage due to a premature movement of the traverse structure 224 leftwardly along the machine.

Although a particular preferred embodiment of my invention has been disclosed in detail herein for illustrative purposes, it will be understood that variations or modifications of such structure, many of which will come within the scope of this invention, are fully contemplated unless specifically stated to the contrary in the appended claims.

I claim:

1. In a screen printing machine having a table with a horizontal top, a screened frame hingedly mounted at one end upon said top for movement about the hinge axis into and out of a position parallel with said top, and an applicator for spreading liquid within said frame, apparatus for moving said applicator along a path parallel with said top and perpendicular to said axis comprising: a pair of rails parallel with said path of movement of said applicator and fixed with respect to said table on opposite sides thereof; a pair of upright elements slidably mounted upon said rails and pivotally supporting said applicator therebetween; interconnect means beneath said top preventing relative movement between said elements; actuating means operable by movement of said frame into said position for urging said elements along said rails away from said hinge axis; and linkage operable by said elements for reversing the direction of said urging and for moving said frame out of said position when said elements are adjacent said hinge axis.

2. In a screen printing machine having a table with a horizontal top and a screened frame hingedly mounted at one end upon said table top for movement about the hinge axis between a position parallel with said top and a position at an angle thereto, apparatus for automatically applying a liquid through said screen to a sheet of material on said table top comprising: a pair of rails perpendicular to said axis and fixed with respect to said top along the opposite edges thereof; a pair of upright elements slidably supported upon said rails, and interconnect means beneath said top effecting simultaneous movement of said elements; a liquid applicator pivotally supported upon and between said elements above said frame for engagement with the screen in said frame; actuating means operable by movement of said frame into said parallel position for urging said elements along said rails and away from said hinge axis; and linkage operable by said elements for reversing the direction of said urging.

3. A machine for automatically applying a liquid to selected portions of a sheet of material comprising: a table having a substantially horizontal top, a screened frame hingedly mounted at one end upon said table top for movement about the axis of said hinge between a position parallel with and adjacent to said top and a raised position at an angle thereto; lift mechanism secured to the other end of said frame for urging same into said raised position; a pair of rails perpendicular to said axis and fixed with respect to said top along the opposite edges thereof; a pair of upright elements slidably supported upon said rails, and interconnect means beneath said top effecting simultaneous movement of said elements; a liquid applicator pivotally supported upon and between said elements above said frame for engagement with the screen in said frame; actuating means operable by movement of said frame into said parallel position for urging said elements along said rails and away from said hinge axis; and linkage operable by said elements for reversing the direction of said urging and for operating said lift mechanism when said elements are adjacent to said hinge axis.

4. The structure of claim 1 wherein one of said rails is a hollow cylinder adjusabtly fixed with respect to said hinge axis and said actuating means includes a transverse partition in said one rail, a pair of spaced pistons in said one rail on opposite sides of said partition and means connecting said pistons to each other and to said elements for simultaneous movement.

5. The structure of claim 1 wherein one of said rails is a hollow cylinder fixed with respect to said hinge axis and said actuating means includes a transverse partition in said one rail, a pair of spaced pistons in said one rail on opposite sides of said partition and means connecting said pistons to each other and to said elements for simultaneous movement, the movement of said elements being twice as much as, and in a direction opposed to, the movement of said pistons.

6. In a screen printing machine having a table with a horizontal top, a screened frame hingedly mounted at one end upon said top for movement about the hinge axis into and out of a position parallel with said top, an applicator for spreading liquid within said frame, and structure supporting said applicator for movement parallel with said top and perpendicular to said axis, apparatus for effecting said movement comprising: a pair of spaced rails parallel with said top and affixed to said table for slidably supporting said structure, one rail being a hollow cylinder; a transverse partition in said one rail; a pair of spaced pistons in said one rail on opposite sides of said partition; a source of fluid under pressure; a pair of conduits communicating between said source and the interior of said one rail on opposite sides of said partition and between said pistons at all times; a fluid control operable by said movement of said frame into said position to direct fluid through said conduits in opposite directions, and operable by said structure to reverse the flow of said fluid in said conduits; and means connecting said pistons to each other and to said structure for simultaneous movement thereof.

7. The structure of claim 1 wherein one of said rails is a hollow cylinder fixed with respect to said hinge axis and said actuating means comprises: a transverse partition in said one rail; a pair of spaced pistons in said one rail on opposite sides of said partition; a source of fluid pressure; a pair of conduits communicating between said source and the interior of said one rail on opposite sides of said partition and between said pistons at all times; a fluid control operable by said movement of said frame into said position to direct fluid through said conduits in opposte directions, and operable by said linkage to reverse the flow of said fluid in said conduits; and means connecting said pistons to each other and to said elements for simultaneous movement thereof.

8. In a screen printing machine having a table with a horizontal top, a screened frame hingedly mounted at one end upon said top for movement about the hinge axis into and out of a position parallel with said top, an applicator having a squeegee parallel with said axis for selectively applying liquid to the screen in said frame, and structure supporting said applicator for movement parallel with said top and perpendicular to said axis, said applicator being pivoted about an axis parallel with said hinge axis, apparatus for controlling said applicator and the liquid thereon comprising: linkage operable by said movement of said structure for pivoting said applicator between two positions inclined to the vertical and on opposite sides thereof, said applicator being spaced from said screen in one of said positions; a roller and means pivotally supporting same upon said applicator parallel with said pivot axis for movement between a location directly beneath said squeegee when said applicator is in said one position and a location of engagement with said screen during at least a portion of the time when said applicator is in its other position.

9. In a screen type printing machine: a table having a horizontal top; an outer frame mounted for association with the horizontal top of said table; an inner frame mounted within said outer frame and having a screen-like member positioned thereon; a plurality of spaced pressure screws extending through, and threadedly engaged by, the outer frame, the inner ends of said screws bearing against said inner frame for urging the adjacent portion thereof inwardly; a plurality of spaced tension screws slidably extending through said outer frame and threadedly engaging said inner frame for urging the adjacent portion thereof outwardly, said pressure and tension screws being disposed substantially alternately around said frames; and an applicator positioned in operative relationship to said inner frame and adapted to spread liquid within said frame and through said screen-like member.

10. In a screen printing machine having a table with a horizontal top: a screened frame mounted for association with the horizontal top of said table; an applicator for spreading liquid upon the screen within said frame; actuating means causing said applicator to engage said screen and move relative thereto and then lifting said applicator out of engagement with said screen; a substantially cylindrical element; and means supporting said element substantially parallel with said applicator for rotation about its lengthwise axis, said element being movable into, and out of, a position between said applicator and said screen, when said applicator is out of engagement with the screen, to intercept liquid falling from said applicator.

11. Anti-dribble apparatus for applying liquid to a relatively flat surface, comprising: an applicator having a surface engaging edge; means effecting relative movement between said edge and said surface in a direction transverse of said edge and substantially parallel with said surface; a substantially cylindrical element having its axis substantailly parallel with said edge; and means rotatably supporting said element upon said applicator for selected movement into, and out of, a position between said edge and said surface, said position being spaced from said surface and located beneath said applicator to intercept liquid dropped therefrom.

12. In a machine having apparatus for applying a liquid to a relatively flat surface and means for effecting relative movement between said apparatus and said surface in a direction substantially parallel with said surface, the combination comprising: an applicator having a surface engaging edge disposed transversely of said direction; a substantially cylindrical element having its axis substantially parallel with said edge; and means rotatably and pivotally supporting said element upon said applicator for selected movement into, and out of, a position between said edge and said surface, said position being spaced from said surface and located beneath said applicator to intercept liquid dropped therefrom.

13. The structure of claim 12, wherein said supporting means includes a pair of substantially parallel arms pivotally supported at one pair of corresponding ends upon said applicator, and rotatably supporting said element upon, and between, the other corresponding ends of said arms.

14. The structure of claim 12, wherein said applicator is movable toward and away from said surface, said element is pivotally supported upon said applicator, and said element rolls along said surface during a portion of said relative movement when said edge is in engagement with said surface.

15. The structure of claim 12, wherein said applicator is movable toward and away from said surface, said element is pivotally supported upon said applicator, and said element rolls along said surface in advance of said edge during a portion of said relative movement when said edge is in engagement with said surface.

16. The structure of claim 12 wherein said apparatus includes means for pivotally supporting said applicator for movement about an axis substantially parallel with said edge, said applicator supporting means is slidably movable toward, and away from, said surface, and said applicator supporting means is engageable by cammed means which is responsive to said relative movement between said edge and said surface for simultaneously effecting both said pivotal movement and said movement toward, and away from, said surface.

17. An anti-dribble apparatus for applying liquid to a relatively flat surface, comprising: an applicator having an edge engageable with said surface; a roller axially parallel with said edge; means pivotally supporting said roller for movement into, and out of, a position adjacent to the said edge for receiving liquids dropped therefrom, said roller being rotatably mounted upon said support means.

18. The structure of claim 17, wherein said applicator is provided with a liquid reservoir adjacent to said edge.

19. The structure of claim 17, wherein said roller and said edge are simultaneously engageable with said surface.

References Cited in the file of this patent

UNITED STATES PATENTS

| 1,474,043 | Keiper | Nov. 13, 1923 |
| 1,687,080 | Beck | Oct. 9, 1928 |
| 1,776,459 | Tull et al. | Sept. 23, 1930 |
| 1,966,416 | Parmele et al. | July 10, 1934 |
| 2,610,579 | Wing | Sept. 16, 1952 |
| 2,637,269 | Thomas | May 5, 1953 |
| 2,684,027 | Kirchner | July 20, 1954 |